United States Patent [19]

Doyle

[11] Patent Number: 4,537,508

[45] Date of Patent: Aug. 27, 1985

[54] INTERFEROMETER SPECTROMETER HAVING IMPROVED SCANNING REFERENCE POINT

[75] Inventor: Walter M. Doyle, Laguna Beach, Calif.

[73] Assignee: Laser Precision Corporation, Utica, N.Y.

[21] Appl. No.: 470,937

[22] Filed: Mar. 1, 1983

[51] Int. Cl.³ .............................................. G01B 9/02
[52] U.S. Cl. .................................................... 356/346
[58] Field of Search ......................................... 356/346

[56] References Cited

U.S. PATENT DOCUMENTS 3,936,193  2/1976  Auth ..................................... 356/346
4,383,762  5/1983  Burkert ............................... 356/346

OTHER PUBLICATIONS

Steel, "Interferometers for Fourier Spectroscopy", *Proc. Aspen Conference on Fourier Transform Spectroscopy*, pp. 43–53.

*Primary Examiner*—Davis L. Willis
*Assistant Examiner*—Matthew W. Koren
*Attorney, Agent, or Firm*—Thomas J. Plante

[57] ABSTRACT

An interferometer, for use in spectrometry, is disclosed in which a more reliable synchronization of the starting points of successive analytical scans is obtained by combining:

(a) a moving retro-reflector in the variable-length arm which reflects both the analytical beam and the reference beam;

(b) stationary reflecting means in the variable-length arm providing a flat "folding" reflector which causes the path of at least the reference beam from the retro-reflector to be folded on itself and returned to the retro-reflector; and (c) stationary reflecting means for the reference beam in the fixed-length arm so located as to offset the reference interferogram with respect to the analytical interferogram. Two versions of the invention are shown, each having two disclosed embodiments. In one version all three of the beams (clock, reference, and analytical) are "folded" by means of mirrors located adjacent to the moving retro-reflector. In the other version only the reference beam is folded.

20 Claims, 9 Drawing Figures

INTERFEROMETER SPECTROMETER HAVING IMPROVED SCANNING REFERENCE POINT

BACKGROUND OF THE INVENTION

This invention relates to spectrometers of the type which incorporate interferometers and use the Fourier Transform performed by a computer to convert electronic signals derived from the optical output of the interferometer into spectral analysis data.

Such interferometers generally incorporate three radiation sub-systems:

(1) the infrared radiation which is the basic analytical beam;
(2) a monochromatic (laser) beam which derives pulses from a periodic fringe pattern to "clock" the sampling of detector signals by the computer system; and
(3) a wide-band, or "white" light beam which is used to start each spectral scanning sweep at the identical point in the spectrum, in order that the integrated spectral data output will have maximum accuracy.

Alignment of the various interferometer optics and radiation beams requires extreme accuracy. One of the major problems is any undesired change of position of an optical element which has the effect of altering the relationship between the white light which produces the scanning reference point and the infrared light which produces the spectral analysis data. The correct relationship of the laser clocking beam to the other beams is also highly critical, but its arrangement is not the central feature of the present invention. The white light beam, which is itself passed through an interferometer, provides the synchronization pulse at some fixed point during the scan, in order to enable the data of successive scans to be coherently co-added. The central maximum of the interferogram provides a natural pulse for this purpose. However, in most systems, sampling must begin somewhat before the central maximum of the basic infrared spectral analysis interferogram. Therefore, it is necessary to obtain a displaced central maximum to use as a starting point reference. The usual means of accomplishing this displacement is to use a "secondary interferometer" which scans a white light signal during the same motion as the infrared scanning, but which is so located that the central maximum of the white light interferogram can be used to start the scan of the infrared interferogram. Generally, it is desirable to have the peak of the infrared interferogram near the center of the scan. In commercial instruments this is done in a variety of ways.

Interferometers in current use are susceptible to "shift" of the white light reference point (with respect to the infrared scan) under certain conditions. For example, certain instruments of Digilab use a small secondary interferometer, which is mounted back-to-back with a broad infrared interferometer, and which is adjusted to give the desired displaced white light central maximum. Since the two interferometers are back-to-back and use different mounting structures, the position of the displaced white light maximum is highly temperature dependent. In other words, temperature change can vary the relative path lengths of the white light and the infrared light, thereby shifting the starting point of the infrared scan. Certain instruments of Nicolet provide a separate white light interferometer which is mounted to one side of the infrared interferometer. If the moving element which carries the mirrors of both interferometers should tilt, such tilting will have its maximum effect on the position of the white light mirror, thereby giving rise to a significant shift of the white light reference central maximum relative to the infrared interferogram.

The present application is primarily concerned with improving the reliability of synchronization of the successive infrared scans by insuring against any displacement of the position where the white light, or reference, interferogram initiates the recorded infrared, or analytical, scan.

SUMMARY OF THE INVENTION

In the present invention, the interferometer combines:

(a) a moving retro-reflector in the variable-length arm which reflects both the analytical beam and the reference beam;
(b) stationary reflecting means in the variable-length arm providing a flat "folding" reflector which causes the path of at least the reference beam from the retro-reflector to be folded on itself and returned to the retro-reflector; and
(c) stationary reflecting means for the reference beam in the fixed-length arm so located as to offset the reference interferogram with respect to the analytical interferogram.

It is considered desirable, and in some instances necessary, that the reference and analytical beams follow parallel paths through the interferometer, and that the beam or beams which impinge on the folding reflector be perpendicular to it.

Two versions of the invention are shown, each having two disclosed embodiments. In one version all three of the beams (clock, reference, and analytical) are "folded" by means of mirrors located adjacent to the moving retro-reflector. In the other version only the reference beam is folded. It is expected that the two versions will be useful for instruments having somewhat different basic goals in terms of performance vs. cost.

A further desirable feature of the present invention is the use in both the analytical (infrared) channel and the reference (white light) channel of the same radiation source, the same source—collimating optics, and the same retroreflectors.

DETAILED DESCRIPTION OF SPECIFIC EMBODIMENTS

As previously stated, either the version in which all three radiation beams are folded or the version in which only the reference beam is folded might be selected, depending on the intended use of the analytical instrument. Somewhat paradoxically, the version in which all three beams are folded is more likely to be used in lower cost apparatus, whereas the version in which only the white light beam is folded is more likely to be used in apparatus requiring maximum resolution. The reason is that folding only the white light beam permits greater infrared throughput, but it also requires more precise alignment of the moving reflector, which may require the use of a relatively costly air-bearing supporting means.

Figure 1:
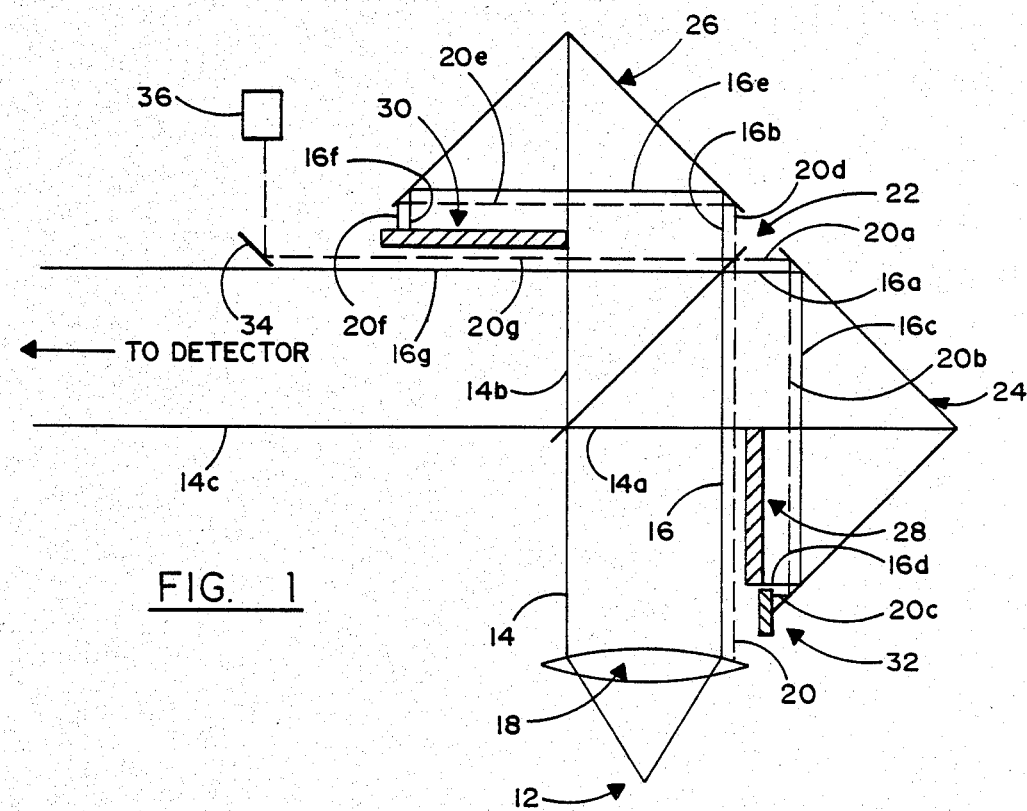
FIG. 1 is a part-schematic, part-plan view of a version of the present invention in which all radiation beams are "folded"

As shown in FIG. 1, a source 12 provides both the infrared (IR) beam and the white light reference beam. The lines 14 and 16 represent the outer rays of a collimated IR beam emanating from focusing optics 18. In essence, the effective shape of any beam in the system is defined by the size of the smallest, or most confining, optical element in its path, which might be the detector, the beam-splitter, or any of the focusing optics or reflectors.

The white light reference beam is represented in FIG. 1 by the dashed line 20, which, for clarity in the illustration, represents the center of the beam, rather than its actual cross-sectional dimensions. The effective shape of the white light reference beam 20 will generally be determined by the entrance aperture of its detector.

The IR and the reference beams are each partially transmitted and partially reflected (preferably 50—50) by a beamsplitter 22, which may use different coating materials for beams having different wavelengths. The reflected portion of the IR beam, defined by outer lines 14a and 16a, is directed toward a movable retroreflector 24, which is shown as a corner reflector (but could also be either a cats-eye or a roof-top retroreflector). The transmitted portion of the IR beam, defined by outer lines 14b and 16b, is directed toward a stationary reflector 26, which is shown as a corner reflector (but could also be either a cats-eye or a roof-top retroreflector, or could simply be a flat mirror).

Both the reflected and the transmitted portions of the IR beam, after they are reflected by their respective retroreflectors, are "folded back" on themselves by stationary flat reflecting mirrors, the reflected IR beam by a flat reflecting mirror 28, and the transmitted IR beam by a flat reflecting mirror 30. In each case, it is necessary that the direction of the radiation reflected by the flat mirror 28 or 30 be perpendicular to the mirror reflecting surface. This folding effect can be better explained by following the lines reflecting the outer edge 16 of the IR beam. The ray 16a reflected by beamsplitter 22 is first reflected as ray 16c by the retroreflector 24 and again reflected by the same retroreflector as ray 16d, which directs it toward flat mirror 28. Flat mirror 28 causes the ray to return along its path 16d, 16c and 16a to beamsplitter 22, where it is recombined with the transmitted portion of ray 16. Simultaneously, the ray 16b transmitted by beamsplitter 22 is first reflected as ray 16e by the retroreflector 26, and again reflected by the same retroreflector as ray 16f, which directs it toward flat mirror 30. Flat mirror 30 causes the ray to return along its path 16f, 16e and 16b to beamsplitter 22, where it is recombined with the reflected portion of ray 16.

Movement of retroreflector 24, while retroreflector 26 remains stationary, causes scanning by the interferometer, which produces the data for spectral analysis.

The combination of the movable scanning retroreflector 24 with the stationary flat "folding" mirror 28 provides an interferometer design which is insensitive to both "tilt" and "shear" displacement of the moving reflector. As pointed out in an article by W. H. Steel in the Proceedings of the Aspen Conference on Fourier Transform Spectroscopy (U.S. Govt. Report AD-724-100, Pages 48 and 49, Section 3-5.3, and FIG. 3-9), tilting has no effect when a retroreflector is used instead of a flat mirror as the moving element in the interferometer. However, accidental lateral displacement of the retroreflector does produce a shear effect. By combining the moving retroreflector with a stationary "folding" mirror, which receives radiation from the retroreflector and returns it to the retroreflector, the interferometer is made insensitive to shear as well as tilt, and therefore is fully compensated.

This benefit of eliminating shear sensitivity is accompanied by a reduction in the radiation throughput of the interferometer, which is a trade-off in design considerations. If maximum throughput is desired, then the "folding" mirror for the IR radiation will be omitted, and greater care and expense will be required in guiding the moving retroreflector, generally necessitating an air-bearing supporting mechanism.

The present invention provides a separate stationary reference-light folding mirror 32, which is offset in its position from the position of the IR beam folding mirror 28. The white light reference beam 20 is partially transmitted and partially reflected by the beamsplitter 22. The reflected portion, illustrated by dashed line 20a, is reflected by the retroreflector along dashed line 20b, and then again reflected by the retroreflector along dashed line 20c toward offset folding mirror 32. The folding mirror 32 returns this beam back along the lines 20c, 20b and 20a to beamsplitter 22. The transmitted portion of the reference beam 20 follows dashed line 20d to the stationary retroreflector 26, then follows dashed line 20e to the other side of the same retroreflector, where it is reflected along dashed line 20f. This beam is returned, by the same folding mirror 30 which returns the IR beam, along dashed lines 20f, 20e and 20d to the beamsplitter 22, where it is recombined with the reflected portion of the reference beam 20.

Because of the offset position of the separate reference-beam folding mirror 32, the peak of the reference beam interferogram, which is used to begin the scan of the IR analytical beam, is offset from the peak of the IR beam interferogram. By initially setting the position of the separate reference-beam folding mirror 32, and thereafter maintaining it "locked" in that position with respect to the analytical beam folding mirror 28, the desired location of the peak of the analytical scan can be obtained, and the repetition of the identical starting point of each analytical scan can be insured.

Where both the analytical and reference beams are folded, as in FIG. 1, it would be feasible to locate the offset reference-beam folding mirror 32 in the fixed-length arm of the interferometer, if desired. What is required is that one arm of the reference beam be offset, so that the peak of the reference interferogram is offset from the peak of the analytical interferogram.

Furthermore, it is feasible to provide for adjustability in the position of the offset reference beam folding mirror, in order to permit changes of the starting point of the analytical scan, if different conditions of use warrant such changes. While an adjustability feature having infinite adjustability between its end positions might be undesirably expensive, various other, more cost-effective arrangements are possible.

The reflected and transmitted reference beams, after being recombined at beamsplitter 22, follow the direction indicated by dashed line 20g (except for the portion returned toward the source), and are reflected by a mirror 34 toward a detector 36, which senses the reference (white light) radiation and transmits data to the electronics system (not shown). The recombined analytical radiation beams are shown in the figure having boundaries 14c and 16g, as the collimated IR beam (except for the portion returned toward the source) is directed toward its detector (not shown), which senses the analytical (IR) radiation and transmits data to the electronics system. It is important that the reference radiation signals, which are out of phase with the analytical radiation signals, not be mixed in the spectrometer output. While this can be accomplished by signal discrimination in the electronics system, it is much better to block out the reference radiation from the path of the analytical radiation, a consideration which in part dictates the shape of mirror 34.

The path of the laser beam which provides for clock pulses timing detector signal sampling of the analytical beam is not illustrated in FIG. 1. It is important that all three beams—laser clock beam, IR analytical beam, and white light reference beam—be phase-locked to one another. This is best accomplished by insuring parallelism of the three beams. When a stationary flat folding mirror is used in conjunction with a retroreflector (movable or stationary), and all three beams are "folded", they should each be perpendicular to the folding mirror. This parallelism, coupled with the offset position of the reference-beam folding mirror, provides both (a) phase coherence independently of shear or tilt in the movable reflector, and (b) an appropriately located synchronization, or reference, signal from the white light beam.

The scan of the IR analytical beam begins with a specific laser clock pulse, determined by the counting of such pulses which begins with the first pulse after the peak of the reference interferogram. If a complete analytical scan, without folding of the laser beam, has 4096 detector read-outs caused by the laser clock, then folding of the laser beam will double the number of detector read-outs per scan, making it 8192. This provides a performance advantage in the spectrometer, because of the greater sampling resolution, but it increases the risk of moving the scan start into the next clock pulse. The folding of the analytical and reference beams has the advantage of providing sharper peaks in their interferograms, but also involves the trade-off of increased risk of degradation if displacement occurs. The folding effect causes longer travel of the beams during a given amount of travel of the moving retroreflector. This means that greater resolution and/or shorter travel of the moving retroreflector are feasible. Shorter travel makes precise control less difficult.

The need for phase-locking between the three beams is obvious. The laser clock beam provides a frame of reference within which the other beams must not be allowed to shift. If there is any shifting of the analytical interferogram with reference to the clock pulses, there will be immediate degradation of the spectrometer output. Very slight shifting of the reference interferogram with respect to the clock pulses would not be significant if its synchronization point did not move past a clock pulse; but if it did move past a clock pulse, the degradation of the spectrometer output would become a significant concern.

Figure 3:
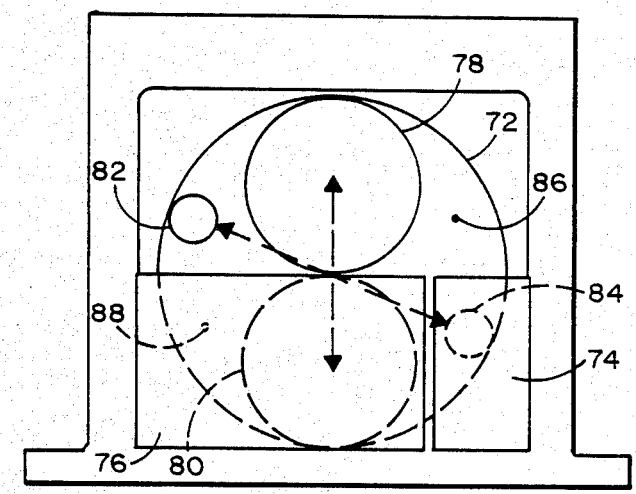
FIG. 3 is a view taken on the line 3—3 of FIG. 2.
Figure 2:
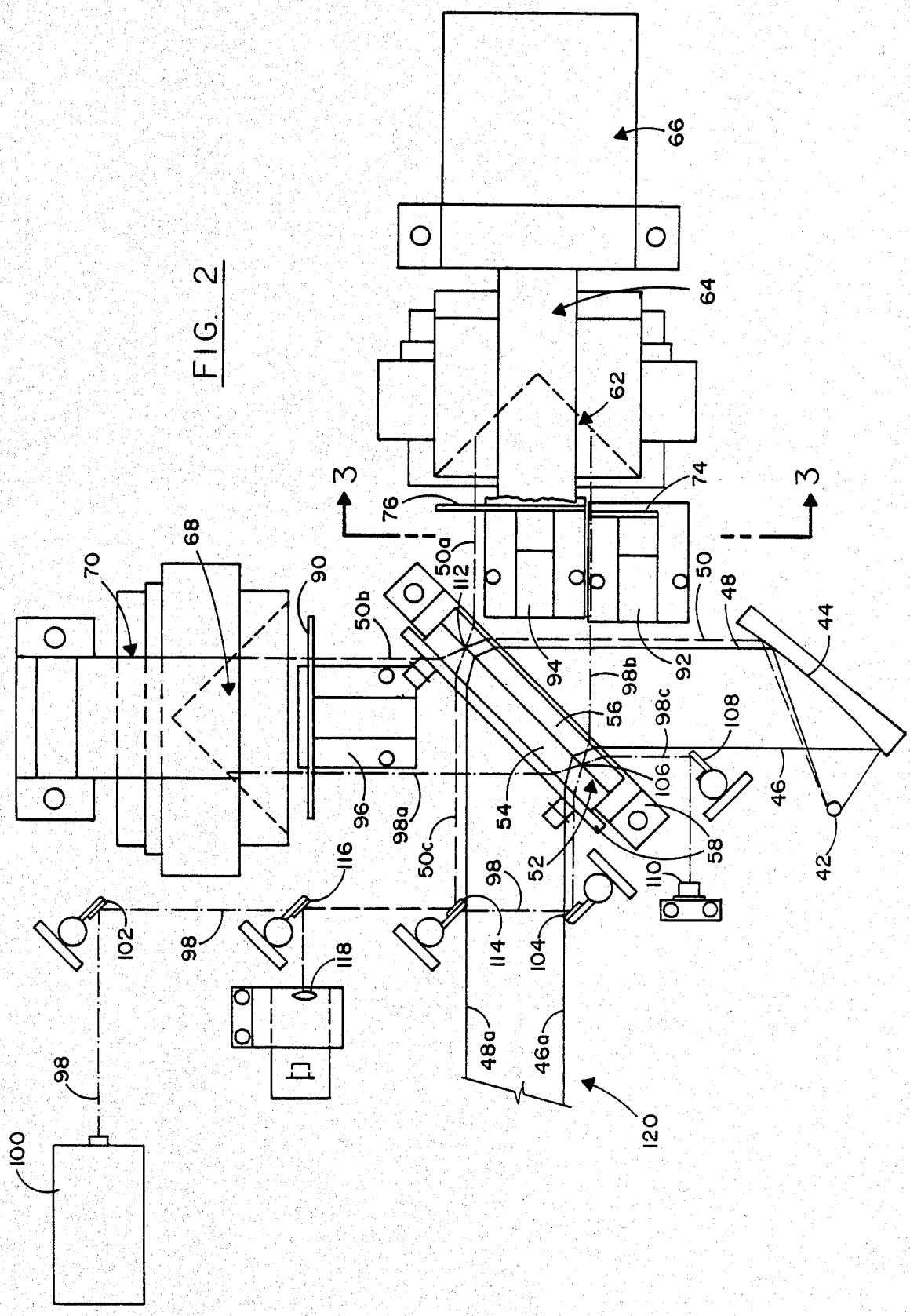
FIG. 2 is a plan view of an experimental physical embodiment of the version shown in FIG. 1.

FIGS. 2 and 3 show a physical embodiment of the invention which provides a practical operating design. Radiation from a source 42 is reflected by a parabolic mirror 44 to provide a collimated analytical (IR) beam represented by the outer lines 46 and 48. The peripheral portion of the source radiation is available as the reference beam, the center ray of which is represented by dashed line 50. A beam-splitter 52 is provided on one of the inner surfaces of a pair of optical flats 54 and 56, supported on a mounting structure 58.

A movable retroreflector 62 is shown supported on a bearing structure 64, and associated with a magnetic motor 66 which causes the retroreflector 62 to have reciprocating motion. A fixed retroreflector 68, facing at right angles to the movable retroreflector, is supported by a mounting structure 70.

The folding mirrors in FIGS. 2 and 3 extend horizontally across the lower half of the radiation-reflecting areas of the respective retroreflectors. This is shown most clearly in FIG. 3, where a part solid, part dashed circular line 72 indicates the open end of retroreflector 62. A small folding mirror 74, which reflects the reference beam, is shown at the right end of a larger folding mirror 76, which reflects the analytical beam. In FIG. 3, the portion of the source-generated analytical beam which has been reflected by the beamsplitter 52 is represented by a solid circular line 78 as a collimated beam entering (and leaving) the top of retroreflector 62, and by a dashed circular line 80 as a collimated beam reflected by retroreflector 62 toward the folding mirror 76, and by the folding mirror back toward the retroreflector. (The analytical beam is reflected diametrically across the retroreflector both as it moves toward the folding mirror 76 and as it moves back out of the retroreflector.)

A solid circular line 82 represents a collimated reference beam entering the retroreflector from the beamsplitter, and a dashed circular line 84 represents a collimated reference beam which is reflected by the retroreflector 62 toward the small folding mirror 74, and by the folding mirror back toward the retroreflector. (The reference beam is also reflected diametrically across the retroreflector both as it moves toward the folding mirror 74 and as it moves back out of the retroreflector.) Because the collimated analytical beams fill only part of the circular area of the retroreflector's open end 72, a suitable area for the reference beam is readily available. Also, the laser clock beam may be conveniently directed into and out of retroreflector 62, and back and forth from folding mirror 76, as shown by the entering beam solid circular line 86 and the reflected beam dashed circular line 88.

A single folding mirror 90 extends across the lower half of the stationary retroreflector 68, and causes all of the beams (analytical, reference and clock) to be reflected back toward retroreflector 68. Because the reference and analytical beams from the beamsplitter travel different distances in the variable-length interfereometer arm, but the same distance in the fixed-length interferometer arm, the reference and analytical interferograms are offset from one another.

Each of the three folding mirrors 74, 76 and 90 is stationary, and is supported by its respective mounting structure 92, 94 and 96. However, their relative positions may be initially adjusted to balance the arms of the analytical inter-ferometer, and to provide the desired offset of the reference interferometer.

In FIG. 2, the laser clock beam 98, which is indicated by a dash-dot line, is shown coming from a laser generator 100, and being reflected by mirrors 102 and 104, so as to strike beamsplitter 52 at 106, the reflected portion of the laser beam going toward stationary retroreflector 68 along line 98a, and the transmitted portion of the laser beam going toward movable retroreflector 62 along line 98b. The recombined laser beam follows line 98c, and is reflected by a mirror 108 toward a suitable detector 110.

The laser beam 98 and the reference beam 50, as traced in FIG. 2, are at different levels vertically, in order to avoid interference with one another. The reference beam 50 strikes the beamsplitter 52 at 112, the reflected portion of the reference beam going toward movable retroreflector 62 along line 50a, and the transmitted portion of the reference beam going toward stationary retroreflector 68 along line 50b. The recombined reference beam follows line 50c, and is reflected by mirrors 114 and 116 toward a suitable detector 118.

The collimated analytical beam, which is represented by lines 46 and 48 entering the interferometer, is partially reflected by the beamsplitter toward movable retroreflector 62, and is partially transmitted by the beamsplitter toward the stationary retroreflector 68. The recombined analytical beam, which is shown leaving the interferometer by lines 46a and 48a, is directed by suitable optical means through a sample area 120 to a detector (not shown).

Figure 9:
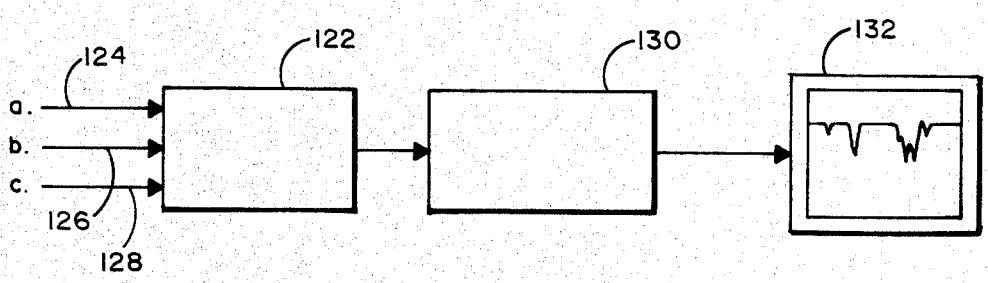
FIG. 9 is a greatly simplified diagrammatic showing of the electronic circuitry into which the interferogram outputs of the IR, white light, and laser detectors are fed.

FIG. 9 shows, in very simple diagrammatic form, the post-detector processing electronics of the spectrometer. A fast Fourier Transform (FFT) processor 122 receives from lead 124 the analytical interferogram signal fro the IR detector, from lead 126 the reference interferogram signal from white light detector 118, and from lead 128 the laser clock signal from laser detector 110. The output of FFT processor 122 is input to central processor 130, and a display terminal 132 is operated from central processor 130.

Figure 4:
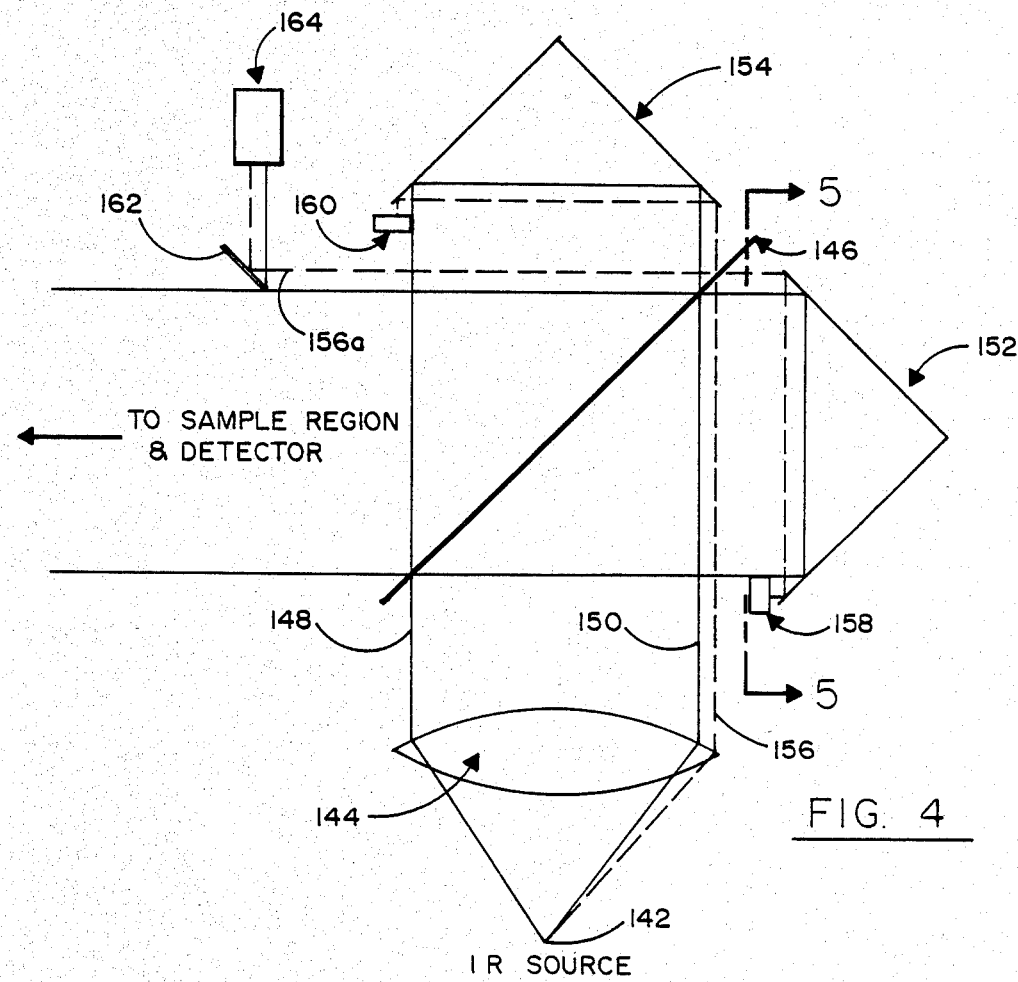
FIG. 4 is a part-schematic, part-plan view of a version of the present invention in which only the reference (white light) radiation beam is folded.
Figure 5:
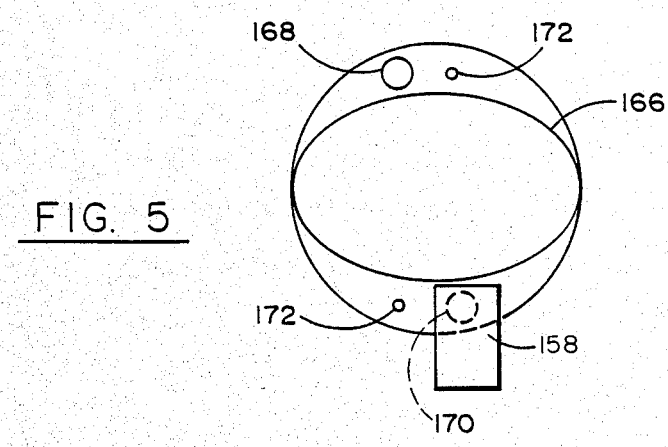
FIG. 5 is a view taken on the line 5—5 of FIG. 4.

FIGS. 4 and 5 show a version of the present invention in which only the reference beam is folded. As in the case of the previously described version, a common source 142 and common focusing optics 144 may supply both the analytical beam and the reference beam. Both beams are split by a beamsplitter 146. The IR analytical beam, having its boundaries indicated by numerals 148 and 150, is partially reflected toward a moving retroreflector 152, and partially transmitted toward a stationary retroreflector 154. The split beams, after returning from the respective retroreflectors, are recombined at beamsplitter 146 and directed to the left toward the IR detector (and also back toward the source). There is no folding mirror which intercepts any portion of the IR analytical beam. As previously stated, this provides a greater throughput than the version of FIGS. 1–3, assuming the use of optics of substantially the same size. However, the white light reference beam, indicated by dashed line 156, is folded. The portion of the reference beam 156 which is reflected by beamsplitter 146 is reflected from one end of movable retroreflector 152 toward a small folding mirror 158, and then back to the movable retroreflector and the beamsplitter. The portion of the reference beam 156 which is transmitted by beamsplitter 146 is reflected from one end of stationary retroreflector 154 toward another small folding mirror 160, and then back to the stationary retroreflector and the beamsplitter.

The two small folding mirrors 158 and 160 must be so positioned that the respective path lengths of the reflected and transmitted reference beams are different from one another when the respective path lengths of the reflected and transmitted analytical beams are the same. This is the offset, of displacement, which permits the peak in the reference interferogram to begin the clock pulse counting sequence which locates the starting point of each analytical scan. The reflected and transmitted reference beams, after recombination at the beamsplitter, are directed, as shown by dashed line 156a, toward a mirror 162, which reflects the reference beam toward its detector 164.

The path of the laser beam is not shown in FIG. 4. Since the analytical beam is not folded in this version of the invention, it is probably preferable not to fold the laser clock beam, in order to minimize risk of any phase shifting between those two beams. As previously stated, in this version of the invention avoidance of shifting of the reference beam with respect to the other two beams may require a relatively expensive supporting-and-guiding mechanism, such as an air-bearing structure. Nevertheless, in this version of the invention, the combination of one or more retroreflectors in the system with the folding mirrors for the reference beam still accomplishes both: (a) phase coherence (assuming the retroreflector does not have shearing motion), and (b) an appropriately offset reference signal to determine the starting point of the analytical interferogram.

A major benefit of this version of the invention is illustrated by the cross-section of the beams shown in FIG. 5. Because the folding mirrors 158 and 160 only block a small portion of the respective retroreflectors, the analytical beam can have a much larger cross-sectional area, thereby, permitting substantially greater throughput. The elliptical cross-section outlined by line 166 indicates the larger throughput of the analytical beam (both entering and leaving the retroreflector). The entering (and leaving) reference beam is indicated by the solid circular line 168, and the folded reference beam is indicated by the dashed circular line 170. The entering and returning laser beams are each shown by a small circle 172.

Figure 6:
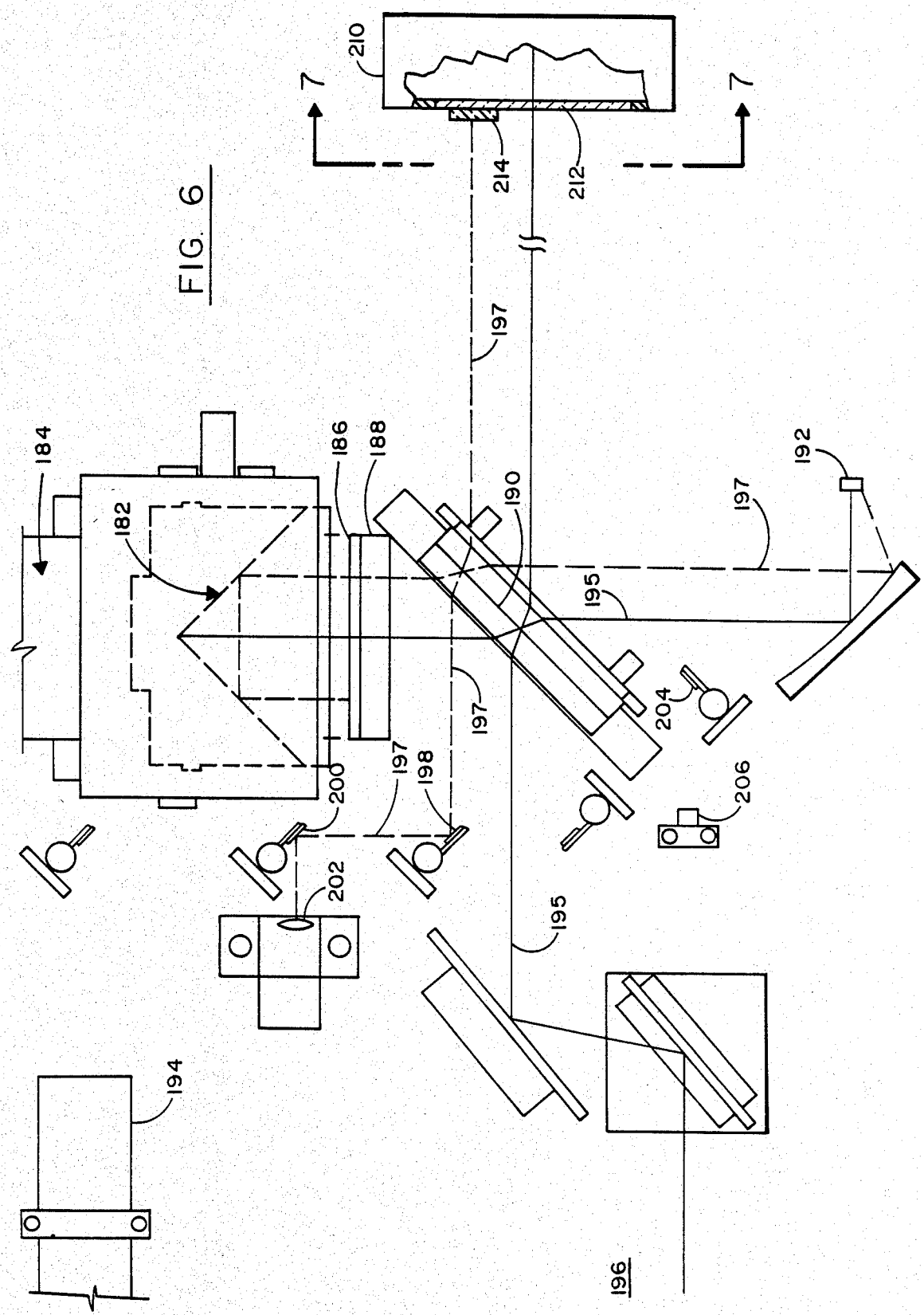
FIG. 6 is a plan view of an experimental physical embodiment of the preferred form of the present invention in which all three radiation beams are "folded", but only one retro-reflector is required.
Figure 7:
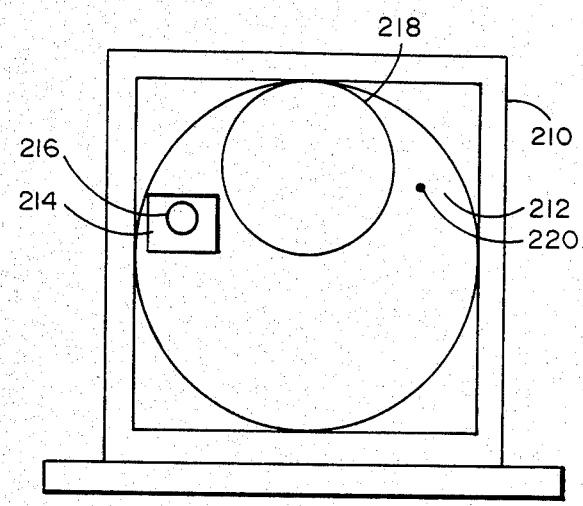
FIG. 7 is a view taken on the line 6—6 of FIG. 5.

FIGS. 6 and 7 show the currently preferred version of the invention, which causes folding of all three beams at the moving retroreflector, but which eliminates the retroreflector in the fixed-length arm, substituting flat mirrors (one of which provides for offset of the reference interferogram).

As shown in FIG. 6, a moving retroreflector 182 is located at the "top" of the figure, suitably mounted for reciprocating travel, and driven by a motor 184.

A stationary folding mirror 186, carried by a support 188, extends horizontally across the bottom half of the retroreflector opening, and provides a folding effect for all three beams—analytical, reference and clock. In this respect it corresponds to the folding mirror 90 in FIG. 2, which is associated with a stationary retroreflector.

A beamsplitter 190 partially reflects and partially transmits the infrared and white light beams from a source 192, and the laser beam from a source 194. The recombined infrared beam, the center of which is indicated in FIG. 6 by solid line 195, goes to the sample chamber 196; the recombined white light beam, the center of which is indicated in FIG. 6 by dashed line 197, is reflected by mirrors 198 and 200 toward detector 202; and the recombined laser beam (which is at a different level vertically from the white light beam) is reflected by a mirror 204 toward detector 206. (This is similar to the arrangement in FIG. 2).

The fixed-length arm of the interferometer is provided by stationary flat mirrors, carried by a suitable support 210, which includes means for initially adjusting the position of the mirrors around both the vertical and the horizontal axis. A relatively large flat mirror 212, which may be located in a recess in support 210, reflects the analytical and laser beams. A small mirror 214, which may be secured by adhesive to the face of mirror 212, reflects the reference beam. Because the face of mirror 214 is suitably spaced in the horizontal plane from the face of mirror 212, the necessary offset of the reference interferograms from the analytical interferograms is obtained. In practice, the small mirror may consist of a slide which is 1 mm thick and has a mirrored outer surface.

The cost advantages of this version are obvious, because of the elimination of one retroreflector. Because the folding effect occurs only in the variable-length arm, the distance from the beamsplitter 190 to the flat mirrors 212 and 214 is substantially longer than the distance from the beamsplitter to the moving retroreflector 182.

FIG. 7 shows the faces of the flat mirrors 212 and 214, and the cross-sections of the three beams. The reference beam 216 is reflected by the small flat mirror 214. The analytical beam 218 and the clock beam 220 are reflected by the large flat mirror 212.

Figure 8:
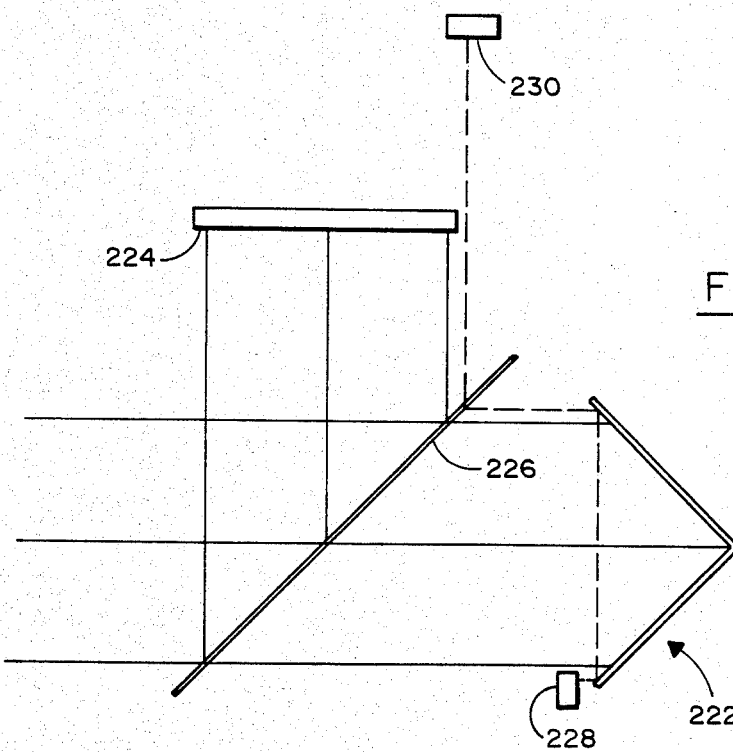
FIG. 8 is a plan view of a modified embodiment of the version of the invention shown in FIG. 4, which only requires one retro-reflector.

FIG. 8 shows schematically the combination of the concept of FIG. 4, in which only the reference beam is folded, with the concept of FIGS. 6 and 7, in which a single retroreflector is sufficient. The interferometer arms of the analytical beam are provided by a movable retroreflector 222 and a flat stationary mirror 224. The analytical beam is not folded, so there are equal distances, in centered position, from beamsplitter 226 to the surface of flat mirror 224 and to the apex of retroreflector 222.

The reference beam is folded by a small stationary flat mirror 228, which receives the reference beam reflected from the retroreflector, and directs it back along the same path. Because the folding effect lengthens significantly the path traveled by the reference beam in its variable-length arm, and because a flat mirror 230 is used to reflect the reference beam in its fixed-length arm, the small flat mirror 230 must be much farther from the beamsplitter than the large flat mirror 224. As in the previous versions of the invention, in any given position of the movable retroreflector, the ratio of the lengths of the two arms of the reference interferometer is somewhat different from the ratio of the lengths of the two arems of the analytical interferometer, in order to provide the necessary offset of the reference and analytical interferograms.

From the foregoing description, it will be apparent that the several embodiments of the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. In a spectrometer having means for receiving and integrating successive analytical interferograms provided by an analytical beam, which analytical interferograms are synchronized by reference interferograms provided by a reference beam, an interferometer, of the type having a fixed-length arm and a variable-length arm which is varied to cause spectral scanning, comprising:
   a moving retroreflector in the variable-length arm which reflects both the analytical beam and the reference beam;
   stationary reflecting means in the variable-length arm providing a flat folding reflector which causes the path of at least the reference beam from the retroreflector to be folded on itself, and returned to the retroreflector; and
   stationary reflecting means for the reference beam in the fixed-length arm so located as to offset the reference interferogram with respect to the analytical interferogram.

2. The apparatus of claim 1 in which the flat folding reflector reflects both the reference beam and the analytical beam.

3. The apparatus of claim 2 in which the reference beam and the analytical beam are parallel to one another in both arms of the interferomter, and both beams impinging on the flat folding reflector are perpendicular to its reflecting surface.

4. The apparatus of claim 2 in which the fixed-length arm of the interferometer includes:
   a first flat mirror reflecting the analytical beam; and
   a second flat mirror reflecting the reference beam, the reflecting surface of the second flat mirror being so located with respect to the reflecting surface of the first flat mirror as to provide different travel distances for the reference and analytical beams in the fixed-length arm.

5. The apparatus of claim 4 in which the reference beam and the analytical beam are parallel to one another in both arms of the interferometer, and both beams impinging on the flat folding reflector are perpendicular to its reflecting surface.

6. The apparatus of claim 5 in which:
   the analytical beam is perpendicular to the first flat mirror in the fixed-length arm; and
   the reference beam is perpendicular to the second flat mirror in the fixed-length arm.

7. The apparatus of claim 4 in which the second flat mirror is secured to the first flat mirror, and which also comprises means for simultaneously providing initial position adjustment of the first and second flat mirrors.

8. The apparatus of claim 2 in which the stationary reflecting means in the fixed-length arm also provides a flat folding reflector which reflects both the reference beam and the analytical beam.

9. The apparatus of claim 8 wherein the flat folding reflector in the variable-length arm comprises an analytical beam reflecting mirror and a reference beam reflecting mirror which have parallel reflecting surfaces providing different interferometer arm lengths.

10. The apparatus of claim 1 in which a common radiation source provides both the reference beam and the analytical beam, which are both collimated and are parallel to one another in both arms of the interferometer.

11. The apparatus of claim 1 in which the beam or beams impinging on the flat folding reflector are perpendicular to its reflecting surface.

12. In a spectrometer having electronic means for receiving and integrating successive analytical interferograms provided by an analytical beam, an interferometer, of the type having a fixed-length arm and a variable-length arm which is varied to cause spectral scanning, comprising:
a retroreflector which provides the end of the variable-length arm of the interferometer;
a reference beam optical system which provides a reference interferogram for synchronizing the starting points of successive scans of the analytical beam;
a stationary reference beam reflector which receives reflected reference beam radiation from the retroreflector and returns it to the same retroreflector, thereby providing an increased reference beam path length change for a given change in the variable-length interferometer arm; and
means for providing a predetermined displacement of the peak signal of each reference interferogram from the peak signal of the corresponding analytical interferogram.

13. The apparatus of claim 12, which also comprises:
a common radiation source for both the analytical beam and the reference beam, the two beams each being collimated, and being arranged to travel in parallel directions throughout the interferometer.

14. The apparatus of claim 13 in which the stationary reference beam reflector also receives reflected analytical beam radiation from the retroreflector and returns it to the same retroreflector.

15. The apparatus of claim 14 which also comprises:
a clocking beam optical system including a laser beam in the interferometer which travels in directions parallel to the reference and analytical beams, and which is reflected by the same reflectors as the analytical beam.

16. The apparatus of claim 12 which also comprises:
two flat reflectors providing the end of the fixed-length interferometer arm, one reflecting the analytical beam, and the other reflecting the reference beam, their relative locations constituting the means for providing displacement between the peak signals of the reference and analytical interferograms.

17. The apparatus of claim 16 in which the stationary reference beam reflector also receives reflected analytical beam radiation from the retroreflector and returns it to the same retroreflector.

18. The apparatus of claim 17 which also comprises:
a clocking beam optical system including a laser beam in the interferometer which is reflected by the same reflectors as the analytical beam.

19. The apparatus of claim 12 in which the stationary reference beam reflector also receives reflected analytical beam radiation from the retroreflector and returns it to the same retroreflector.

20. The apparatus of claim 19 which also comprises:
a clocking beam optical system including a laser beam in the interferometer which is reflected by the same reflectors as the analytical beam.

* * * * *